United States Patent Office 3,825,568
Patented July 23, 1974

3,825,568
PRODUCTION OF ANHYDROUS 1,4-DIOXANE
Hans-Georg Schecker, 28 Berner Weg; Waldemar Koehler, 7 An der Froschlache; and Bruno Sander, 10 Moerikestrasse, all of 6700 Ludwigshafen, Germany
No Drawing. Filed June 27, 1972, Ser. No. 266,607
Int. Cl. C07d 15/00
U.S. Cl. 260—340.6
6 Claims

ABSTRACT OF THE DISCLOSURE

A process for the production of the valuable solvent 1,4-dioxane by dimerization of ethylene oxide in the presence of $SiF_4$ or $BF_3$ or of the addition compound formed from $BF_3$ and 1,4-dioxane as a catalyst, wherein the catalyst is mixed with ethylene oxide present in the liquid phase at a temperature of from —50° C. to 0° C. and the mixture is then kept for another one hour to ten hours at a temperature of from —25° to +10° C. To complete the reaction, the reaction mixture may then be kept for up to three hours at a temperature of from +10° to +40° C. In this process pure 1,4-dioxane is obtained in a high space-time yield and in yields of more than 80% of theory.

---

The invention relates to a process for the production of anhydrous 1,4-dioxane by dimerization of ethylene oxide in the presence of $SiF_4$, $BF_3$ or the adduct forming from $BF_3$ and 1,4-dioxane in the liquid phase.

Several methods are known from the literature in which 1,4-dioxane is obtained by way of various intermediate stages starting from ethylene oxide (cf. A. Faworski, J. Russ. Phys. Chem. Soc. 38 (1906), page 741 and Ullmann, Encyklopädie der technischen Chemie, volume 6, (1955), pages 8 to 9). In these methods the 1,4-dioxane is obtained however in aqueous solution and the further purification and dewatering of the 1,4-dioxane is difficult and expensive.

A process is described in German Patent Specification No. 909,096 by means of which anhydrous 1,4-dioxane is obtained by direct dimerization of ethylene oxide in the presence of a catalyst. According to this Patent Specification gaseous ethylene oxide is dimerized in the presence of $SiF_4$ or an adduct of $BF_3$ to 1,4-dioxane at temperatures of from 15° to 50° C. The yields of 1,4-dioxane thus achieved are however not satisfactory. Moreover the space-time yields of 1,4-dioxane thus achieved are so small that industrial use of the process would hardly be realisable.

It is therefore the object of the invention to provide a process by which anhydrous 1,4-dioxane can be prepared in a simple manner with high yields and high space-time yields and in the purest possible form on a laboratory or industrial scale.

We have now found that the production of anhydrous 1,4-dioxane by dimerization of ethylene oxide in the presence of $SiF_4$ or $BF_3$ or the $BF_3$-1,4-dioxane adduct which forms from $BF_3$ and 1,4-dioxane as a catalyst can be carried out advantageously and with yields of more than 80% by mixing the catalyst with the ethylene oxide which is present in liquid phase at a temperature of from —50° to 0° C. and then keeping the resultant mixture for one to ten hours, preferably one to five hours, at a temperature of from —25° C. to +10° C. It is advantageous to keep the reaction mixture for up to another five hours, preferably up to three hours, at temperatures of from about +10° to about +40° C., preferably from +10° to +15° C., in the liquid phase in order to complete the reaction.

When the process is carried out in this way in the liquid phase much smaller amounts of byproducts such as polyethylene oxides or 2-methyl-1,3-dioxolane are formed than in the process of German Patent Specification No. 909,096.

In accordance with the invention the ethylene oxide is used in liquid phase, i.e. in the form of pure liquid ethylene oxide or dissolved in a solvent which is inert under the reaction conditions.

Suitable solvents are those which are liquid under the reaction conditions, which do not react either with ethylene oxide or with the catalyst and which do not form with 1,4-dioxane an azeotrope which interferes with the subsequent processing operation. Examples are benzene, cyclohexane, pentane and ethylene chloride. 1,4-dioxane itself may be used as the solvent with particular advantage.

The catalysts $SiF_4$ or $BF_3$ are passed in gaseous form into the reaction mixture. Instead of gaseous $BF_3$ the $BF_3$-1,4-dioxane adduct which forms from $BF_3$ and 1,4-dioxane may be added to the reaction solution.

The gaseous catalysts are generally used in amounts of from 0.1 to 5%, preferably from 0.2 to 1.5%, by weight based on the amount of liquid present.

The $BF_3$-1,4-dioxane adduct is generally used in amounts of from 0.5 to 5.0% based on the amount of liquid present.

The process according to the invention may be carried out by various methods.

The usual procedure is that the gaseous precooled catalyst is passed into pure ethylene oxide cooled to —50° to —10° C., preferably —30° to —10° C., or into a solution of ethylene oxide cooled to the said temperature, the temperature of the reaction mixture being kept at from —50° to 0° C., preferably from —30° to —10° C.

The reaction mixture is allowed to continue reacting at a temperature of from about —25° to +10° C. until about 80% of the ethylene oxide has reacted, this being the case after from one hour to ten hours depending on the temperature of the reaction mixture. It has proved to be advantageous to slowly raise the temperature of the reaction mixture continuously or in stages up to about +10° C. after the catalyst has been added to the ethylene oxide and to leave the reaction mixture at a temperature of about +10° C. for one hour to eight hours, preferably from one hour to three hours.

The reaction mixture may then be heated for a short time at a temperature of from +10° to about 40° C. to complete the reaction.

The temperature of the reaction mixture should in any case not exceed +25° C. as long as more than about 25% by weight of ethylene oxide remains in the reaction mixture. The amount of byproducts is particularly low when the reaction mixture is kept at temperatures below 15° C. during the whole of the reaction.

Alternatively the $BF_3$-1,4-dioxane adduct may be introduced in a solvent into liqiud ethylene oxide or into a solution of ethylene oxide while maintaining a temperature in the abovementioned range and the reaction mixture may thereafter be treated as described above.

The reaction is generally carried out at atmospheric pressure. Pressures of up to 30 atmospheres may also be used however. It is recommended that superatmospheric pressure should be used especially when $SiF_4$ is used as the catalyst.

The reaction may be carried out batchwise or continuously.

All reactors which ensure adequate residence times, thorough mixing and adequate withdrawal of heat may be used. For example in batchwise operation stirred vessels or shaker autoclaves may be used having an internal or external cooling system. When working continuously it is advantageous to use a cascade of cooled stirred vessels. The gaseous catalyst may either be fed as a whole continuously into the first vessel or vessels at the beginning of the reaction or it may be passed in equal or unequal amounts into the individual reactors.

Furthermore the ethylene oxide may be fed into only the first reactor or may be apportioned to a number of the reactors. The reaction may be carried on until the ethylene oxide has been completely converted, but the reaction may be interrupted before conversion is complete, for example at from 70 to 80% conversion, and the ethylene oxide which has not yet been reacted may be distilled off at a temperature of from about 10° C. to 20° C., cooled and returned to the reaction.

The reaction mixture is advantageously worked up by fractional distillation; the unreacted ethylene oxide may be withdrawn for example in an interposed column and higher polyethylene oxides may be withdrawn from the bottoms of the distillation vessel.

The process of the invention gives anhydrous 1,4-dioxane in a simple way and in very good product yields and space-time yields. The process may be carried out on an industrial scale without great expenditure.

1,4-dioxane is an excellent solvent for many organic compounds and is distinguished by the fact that it is miscible in all proportions with water and the usual organic solvents.

The following Examples will further illustrate the invention.

The parts given in the Examples are parts by weight unless stated otherwise. They bear the same relation to parts by volume as the kilogram to the liter.

EXAMPLE 1

1000 parts of ethylene oxide is placed in a glass flask provided with a stirrer and an internal cooling coil and is cooled to −20° C.; 10 parts of $BF_3$ is passed in within thirty minutes, the temperature being kept at −20° C. The temperature of the reaction mixture is then allowed to rise within two hours to +10° C. and the reaction mixture is allowed to react further for another two hours at a temperature of 10° C. In this way the ethylene oxide is reacted to the extent of 87.1%.

734 parts of 1,4-dioxane,
52 parts of 2-methyl-1,3-dioxolane and
85 parts of higher polyethylene oxides are formed from 1000 parts of ethylene oxide. The yield of 1,4-dioxane is 84.3% of theory based on ethylene oxide reacted.

EXAMPLE 2

3300 parts of 1,4-dioxane which has been precooled to −20° C. and which contains 6.5 parts of $BF_3$ is added within an hour to 1000 parts of ethylene oxide cooled to −40° C. in a stirred vessel. The temperature thus rises to −20° C. The temperature of the reaction mixture is then allowed to rise within an hour to +10° C. and the reaction mixture is allowed to continue reacting for another hour at 10° C. The ethylene oxide is thus reacted to the extent of 52.8%. The reaction mixture is worked up by distillation and the following are obtained in addition to unreacted ethylene oxide:

462 parts of 1,4 dioxane
41 parts of 2-methyl-1,3-dioxolane and
25 parts of higher polyethylene oxides.

The yield of 1,4-dioxane is 87.5% based on ethylene oxide reacted.

EXAMPLE 3

1000 parts of liquid ethylene oxide and 10 parts of gaseous $BF_3$ are introduced per hour into the first vessel (capacity: 1000 parts by volume) of a continuously operated cascade of stirred vessels consisting of five stirred vessels, each of the last four vessels having twice the volume of the first vessel. The temperature in the first vessel is kept at −20° C. Temperatures in the other four vessels are respectively 0° C., +10 °C, +14° C and +14° C. The total mean residence time in the cascade of vessels is about ten hours. About 1000 parts of reaction mixture is withdrawn per hour from the last vessel.

20 parts of ethylene oxide,
820 parts of 1,4-dioxane,
70 parts of 2-methyl-1,3-dioxolane and
90 parts of higher polyethylene oxides are obtained from each 1000 parts of reaction mixture. The ethylene oxide is thus reacted to the extent of about 99% by this method. The yield of 1,4-dioxane is 82% of of theory based on reacted ethylene oxide.

EXAMPLE 4

1000 parts of ethylene oxide is saturated with gaseous $SiF_4$ in an autoclave at a temperature of −20° C. and a pressure of 20 atmospheres. Reaction sets in immediately. The contents of the autoclave are then kept for five hours at about 0° C. The ethylene oxide is reacted to the extent of 87.5% by this method. The reaction mixture is worked up by distillation and 693 parts of 1,4-dioxane
91 parts of 2-methyl-1,3-dioxolane and
91 parts of higher polyethylene oxides are obtained. The yield of 1,4-dioxane is 79.2% of theory based on ethylene oxide reacted.

EXAMPLE 5

1000 parts of ethylene oxide is saturated with gaseous $SiF_4$ in an autoclave at a temperature of −20° C. and a pressure of 20 atmospheres. Reaction begins immediately. The contents of the autoclave are then kept for one hour at about +10° C. The ethylene oxide is reacted to the extent of 81.3% by this method. Distillation of the reaction mixture gives 635 parts of 1,4-dioxane
88 parts of 2-methyl-1,3-dioxolane and
90 parts of higher polyethylene oxides.

The yield of 1,4-dioxane is 78.1% of theory based on ethylene oxide reacted.

We claim:

1. In a process for the production of anhydrous 1,4-dioxane by dimerization of ethylene oxide in the presence of $SiF_4$ or $BF_3$ or the adduct formed from $BF_3$ and 1,4-dioxane as a catalyst, the improvement which comprises the step of mixing the catalyst with ethylene oxide present in liquid phase at a temperature of from −50° C. to 0° C. and thereafter keeping the mixture obtained at a temperature of from −25° to +10° C. for from one hour to ten hours.

2. A process as claimed in claim 1 wherein the reaction is continued for up to three hours at a temperature of from +10° to +40° C. in the liquid phase.

3. A process as claimed in claim 2 wherein the reaction is continued at a temperature below +15° C.

4. A process as claimed in claim 1 wherein the catalyst is mixed with the ethylene oxide at a temperature of from −30° to −10° C.

5. A process as claimed in claim 1 wherein the catalyst is mixed with ethylene oxide dissolved in 1,4-dioxane.

6. A process as claimed in claim 1 wherein $SiF_4$ is mixed with the ethylene oxide, present in liquid phase, at a temperature of from −50° to 0° C. and at a pressure of up to 30 atmospheres.

References Cited

UNITED STATES PATENTS 2,293,868   8/1942   Toussaint _____ 260—340.6

FOREIGN PATENTS 909,096   4/1954   Germany.

DONALD G. DAUS, Primary Examiner

J. H. TURNIPSEED, Assistant Examiner

UNITED STATES PATENT OFFICE
CERTIFICATE OF CORRECTION

PATENT NO. : 3,825,568
DATED : July 23, 1974
INVENTOR(S) : Schecker et al

It is certified that error appears in the above-identified patent and that said Letters Patent are hereby corrected as shown below:

In the heading insert -- Claims priority, application Germany, July 8, 1971, P 21 34 016.9

Signed and Sealed this thirtieth Day of December 1975

[SEAL]

Attest:

RUTH C. MASON
Attesting Officer

C. MARSHALL DANN
Commissioner of Patents and Trademarks